United States Patent [19]

Paul

[11] Patent Number: 5,665,138
[45] Date of Patent: Sep. 9, 1997

[54] METERING SPOUT BOWL ASSEMBLY

[75] Inventor: Kenneth John Paul, Tolland, Conn.

[73] Assignee: Emhart Glass Machinery Investments Inc., Wilmington, Del.

[21] Appl. No.: 352,007

[22] Filed: Dec. 8, 1994

[51] Int. Cl.$^6$ ................................................. C03B 7/084
[52] U.S. Cl. .............................. 65/325; 65/328; 65/330
[58] Field of Search .......................... 65/325, 328, 330, 65/331, 126, 127, 180, 221, 324

[56] References Cited

U.S. PATENT DOCUMENTS

| | | | |
|---|---|---|---|
| 1,763,968 | 6/1930 | Howard | 65/127 |
| 2,969,614 | 1/1961 | Stewart | 65/180 |
| 4,385,916 | 5/1983 | Jochem et al. | 65/3.13 |

*Primary Examiner*—Donald E. Czaja
*Assistant Examiner*—Calvin Padgett
*Attorney, Agent, or Firm*—Spencer T. Smith

[57] ABSTRACT

A spout bowl assembly for a glass forming machine which forms containers from discrete gobs formed from individual streams of molten glass discharged from the spout bowl assembly comprising a spout bowl for receiving molten glass including a horizontal tube seating surface having a discharge hole defined therein, a tube for controlling the flow of received molten glass into the discharge opening. The tube has a cylindrical outer wall and a flat, horizontal bottom surface located vertically above the tube seating surface and vertically locatable between a first position in engagement with the tube seating surface and an elevated position a selected vertical distance above the tube seating surface. The spout bowl additionally includes an annular flow passage extending upwardly from the tube seating surface a selected vertical distance. The annular flow passage and the bottom portion of the tube wall extending the selected distance from the bottom of the tube being selectively configured relative to one another so that during at least a portion of the displacement of the tube from the engaged position to the upper position will change the effective flow area between the tube and the annular flow passage.

4 Claims, 2 Drawing Sheets

METERING SPOUT BOWL ASSEMBLY

SPECIFICATION

The present invention relates to spout bowl assemblies for glass feeders which continuously deliver one or more streams or runners of molten glass to a shear mechanism which cuts each runner into successive gobs which will be delivered to a glass forming machine like an I.S. or an H-28 machine which forms the discrete gobs into glass containers and the like.

Molten glass is supplied to a forehearth which functions to define a uniform temperature gradient in the molten glass before its discharge into a spout bowl assembly. The spout bowl of the assembly has a discharge opening which is closed by an orifice plate which defines the number of runners of molten glass to be discharged. In a single gob machine, for example, there will be one orifice hole. A tube is used to control the flow of molten glass out of the spout bowl. The tube has a flat bottom which is conventionally located above a flat tube seating surface which is defined at the bottom of the spout bowl. By displacing this tube vertically, the spacing between the bottom of the tube and the seating surface of the spout bowl, and hence the curtain area of the opening therebetween, can be changed.

It has been found that flow through this space does not vary linearly with vertical displacement of the tube and that at certain locations of the tube, a desired change in flow is extremely difficult to achieve by tube displacement because of the nature of the flow vs. displacement curve.

It is accordingly an object of the present invention to provide a spout bowl assembly that can be more easily adjusted to control flow.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings.

Figure 1:
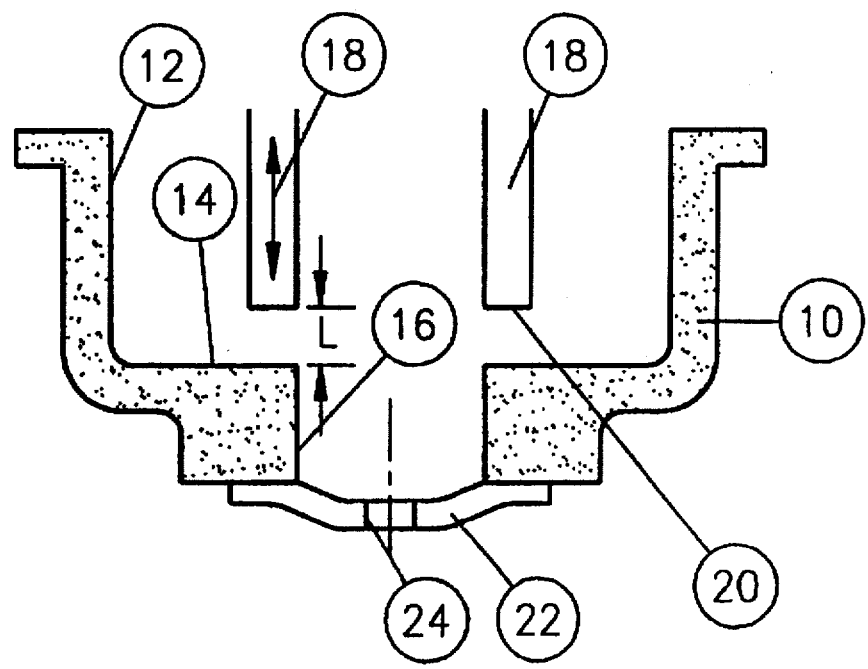
FIG. 1 is an elevational cross sectional view of a prior art spout bowl assembly for a glassware forming machine.

Conventional spout bowl assemblies include a spout bowl 10 which has a generally vertical inside side wall 12, a generally horizontal inside bottom tube seating surface 14 and a cylindrical, vertical, discharge hole 16 and a central vertically displaceable tube 18 having a flat horizontal bottom surface 20 vertically spaced from the bottom tube seating surface of the spout bowl by a variable distance L (when flow is to be stopped, L equals 0). Secured to the bottom of the spout bowl is an orifice plate 22 which has one or more (2, 3 or 4) holes 24 through which the molten glass discharged from the spout bowl will continuously flow. To increase or decrease such flow, the tube will be either raised or lowered.

Figure 2:
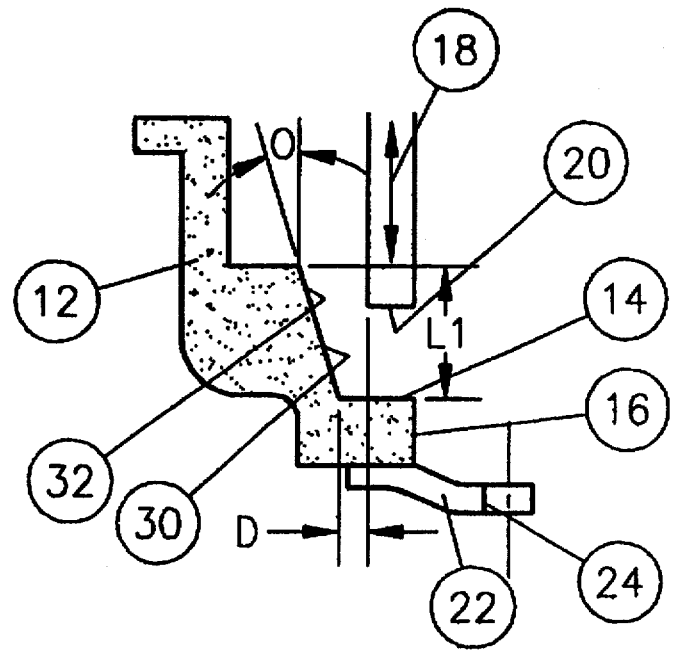
FIG. 2 is a view similar to FIG. 1 illustrating a first embodiment made in accordance with the teachings of the present invention.

The embodiment shown in FIG. 2 shows one design for defining a more linear relationship between vertical tube position and flow. In this embodiment the same relationship exists between the bottom surface 20 of the tube 18 and the bottom tube seating surface 14 of the spout bowl. When flow through the orifice hole(s) 24 is to be controlled; the tube 18 will be located at a location having a spacing of no more than L1.

An annular flow passage 30 having a vertical height corresponding to L1 is defined by an annular side surface 32 which has a contour which is defined relative to the adjacent tube surface to achieve a desired continuously changing flow rate as the tube is elevated to height L1. In this preferred embodiment, this is achieved with a straight side surface that is inclined outwardly at an angle θ (from about 5° to 15°) proceeding upwardly from seating surface 14. This annular side surface 32 intersects the flat horizontal bottom tube seating surface at a location which permits downward movement of the tube into flush engagement with the spout and may intersect the bottom surface at a location offset from the tube plane by a selected distance D.

Figure 3:
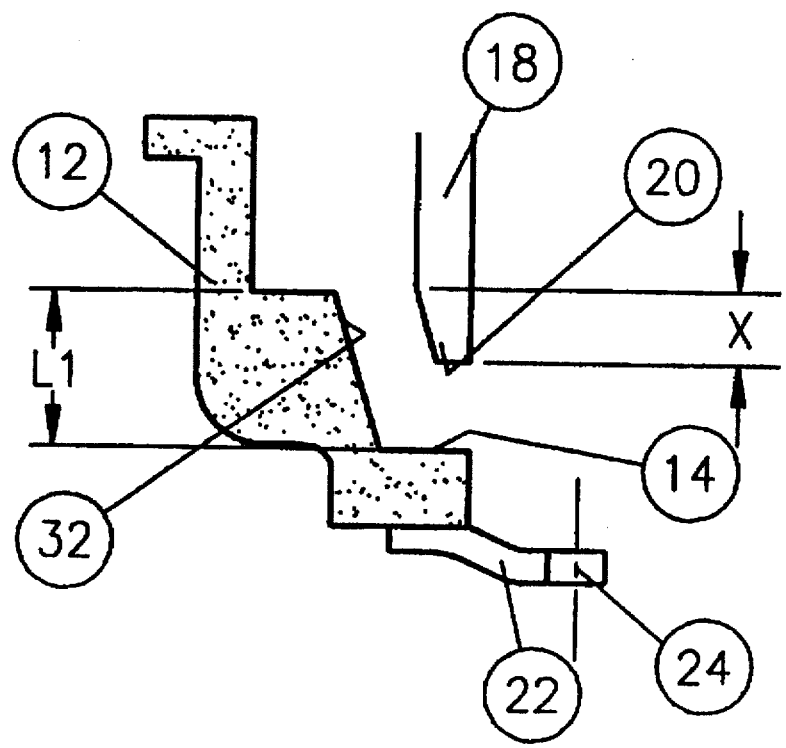
FIG. 3 is a view similar to FIG. 1 illustrating a second embodiment made in accordance with the teachings of the present invention.

Optionally, as shown in the second preferred embodiment illustrated in FIG. 3, the cylindrical outer surface of the tube 18 for a distance up from the bottom of the annular wall of the tube can also be inclined (here parallel to the side surface of the annular flow passage). Either or both of these surfaces can also be curved (parabolic, for example) to achieve the desired continuous flow change per unit vertical displacement of the tube.

Figure 4:
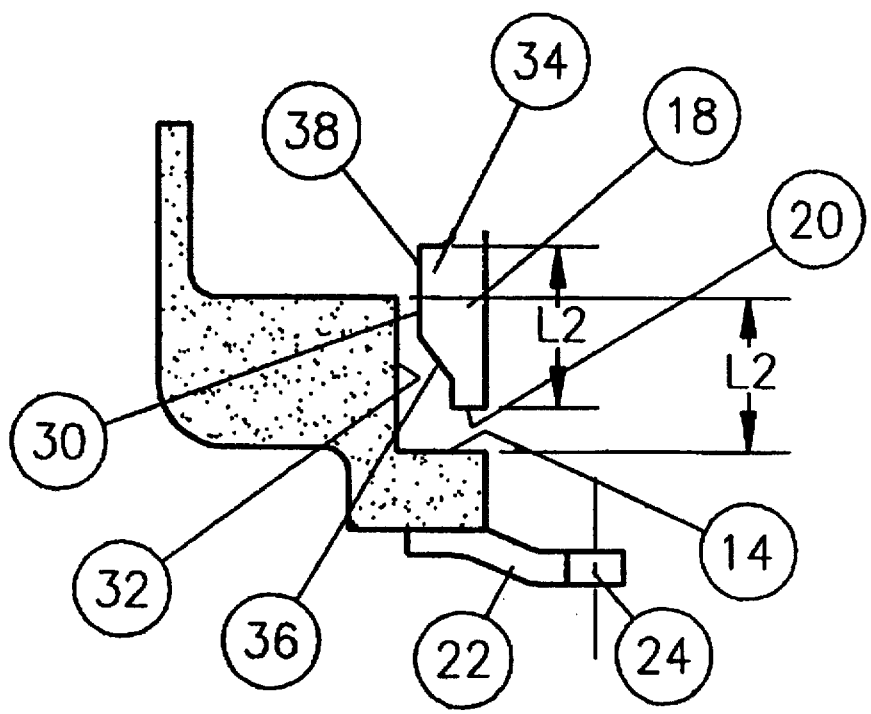
FIG. 4 is a view similar to FIG. 1 illustrating a third embodiment made in accordance with the teachings of the present invention.

FIG. 4 illustrates a third embodiment of the invention wherein the annular flow passage 30 has a vertical annular side wall 32 and an annular flow control collar 34 is defined on the outer surface of the tube. In this embodiment this annular collar 34 is spaced above the bottom of the tube and extends to a vertical height L2 which corresponds to the vertical height of the annular flow passage 30. The collar 34 has an outwardly inclined annular portion 36 which merges into a larger diameter vertical annular surface 38. Since flow resistance is a function of pipe length, flow will be controlled by the adjacent parallel surfaces 32, 38 as a function of tube height (the axial length of this flow conduit) as well as by the non parallel collar surface 36 when that surface is horizontally adjacent the top edge of the annular flow passage.

I claim:

1. A spout bowl assembly for a glass forming machine which forms containers from discrete gobs cut from individual streams of molten glass discharged from the spout bowl assembly, said spout bowl assembly comprising
    a spout bowl for receiving molten glass including a bottom having a horizontal tube seating surface with a discharge hole defined therein, and
    a tube for controlling the flow of received molten glass from said spout bowl into said discharge opening,
    said tube having a cylindrical outer wall and a flat, horizontal bottom surface located vertically above said tube seating surface and vertically locatable between a first position in engagement with said tube seating surface to an elevated position a selected vertical distance above said tube seating surface,
    said tube being located at a fixed location during the operation of said spout bowl assembly,
    said spout bowl additionally including an annular wall extending upwardly from said tube seating surface said selected vertical distance, and
    said annular wall and the bottom portion of said tube wall extending said selected distance from the bottom of the tube being selectively configured relative to one another so that during at least a portion of the displacement of said tube from said engaged position to said upper position the effective flow area between said tube and said annular wall will be changed so that during such portion of the displacement, vertical displacement will change the spacing between said tube bottom surface and said tube seating surface and will conjointly change the effective area between said tube and said wall.

2. A spout bowl assembly according to claim 1, wherein said annular flow passage is inclined and said tube wall is vertical.

3. A spout bowl assembly according to claim 2, wherein at least a portion of the bottom portion of said tube wall is parallel to said inclined annular flow passage.

4. A spout bowl assembly according to claim 1, wherein said tube wall includes an annular outwardly projecting collar portion extending vertically upwardly to a vertical location on said tube said selected distance from the bottom of said tube, said collar portion spaced from the bottom thereof and having a vertical upper portion and a lower inclined portion.

* * * * *